United States Patent [19]

Sette et al.

[11] 4,124,083
[45] Nov. 7, 1978

[54] AUTOMATIC ANALYTICAL WEIGHING SCALE

[75] Inventors: Paul R. Sette, Hamden, Conn.; Anthony Storace, Tarrytown, N.Y.

[73] Assignee: Pitney-Bowes, Inc., Stamford, Conn.

[21] Appl. No.: 807,395

[22] Filed: Jun. 17, 1977

[51] Int. Cl.² .............................................. G01G 7/00
[52] U.S. Cl. .................................................... 177/214
[58] Field of Search ................................. 177/213, 214

[56] References Cited
U.S. PATENT DOCUMENTS
1,405,322  1/1922  Petersen ......................... 177/213 UX

*Primary Examiner*—George H. Miller, Jr.

*Attorney, Agent, or Firm*—Peter Vrahotes; William D. Soltow, Jr.; Albert W. Scribner

[57] ABSTRACT

An automatic analytical balance is disclosed, which features a unique weighing structure. The scale comprises a flexibly pivotable shaft that pivots in one direction in response to a load being weighed, and that pivots in an opposite direction in response to a known movable weight movably disposed upon the shaft. A balance detector is operatively connected to the shaft to determine when the movement of the known weight has brought the shaft into a balanced condition. Means are provided to measure the movement of the known weight which is required to produce the balanced condition in the shaft. This measurement is indicative of the weight of the load being weighed.

5 Claims, 6 Drawing Figures

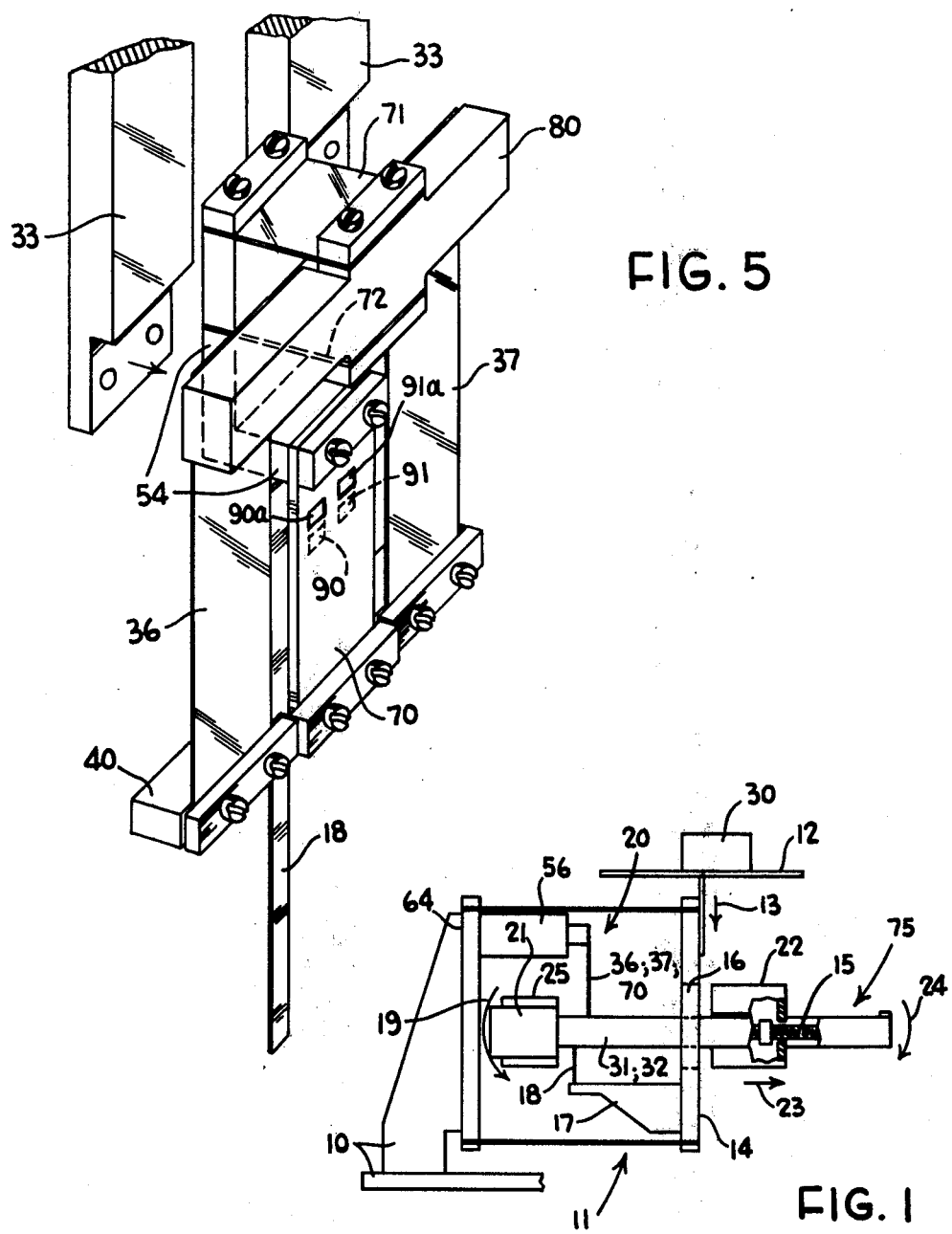
FIG. 5
FIG. 1
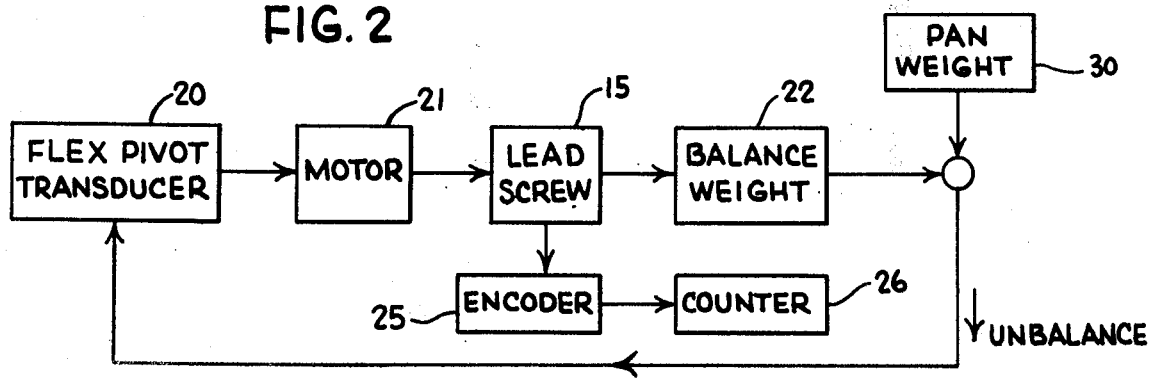
FIG. 2

AUTOMATIC ANALYTICAL WEIGHING SCALE

This invention pertains to weighing scales and more particularly to an analytical balance of improved construction and design.

BACKGROUND OF THE INVENTION

Most of the analytical balances now in use, work on the principle of balancing a load induced moment, and observing the weights or moments that are applied to achieve the desired balanced condition. In this respect, the present scale invention functions no differently than what has generally been in practice in this art.

As is also generally known, a sensitive scale such as an analytical balance usually requires painstaking adjustments to bring the scale into balance, which painstaking adjustments are not only laborious, but are also time consuming.

The present invention was conceived as a means of eliminating the operator's role in making these balance adjustments. The invention eleviates the operator's present drudgery of having to sight the balance recticle, make the necessary adjustments, and wait for the recticle to stabilize in order to obtain a weight reading.

The inventive balance has means of automatically making the adjustments previously required of the operator.

SUMMARY OF THE INVENTION

The invention pertains to an automatic analytical balance. The scale comprises a shaft that is caused to pivot, when a load to be weighed is placed on a load supporting pan attached to the shaft. A movable known weight, movably supported by the shaft, is caused to advance upon the shaft in response to the movement induced by the load being weighed. The advancement of the known weight causes an opposite or balancing moment on the shaft. When a balance detector determines that the two opposing moments are equal, the movement of the known weight is measured. This movement is the measure of the weight of the load being weighed.

The shaft preferably takes the form of a lead screw, and the known weight is threaded thereon. The lead screw is caused to run via a motor, thus advancing the known weight upon the lead screw. An encoder disc operatively attached to the lead screw measures the rotation of the lead screw, and thus measures the advancement of the known weight.

It is an object of this invention to provide an improved analytical balance;

It is another object of the invention to provide an analytical balance device which automatically adjusts the balance to determine the weight of a load being weighed;

It is a further object of this invention to provide an improved analytical balance having a quick response, and which is highly accurate.

These and other objects of this invention will be better understood and will become more apparent with reference to the following detailed description taken in conjunction with the attached drawings, in which:

FIG. 1 is a schematic side view of the analytical balance of the invention;

FIG. 2 is a functional block diagram for the analytical balance shown in FIG. 1;

FIG. 5 is a perspective view of a null indicating transducer shown in FIG. 3.

DETAILED DESCRIPTION

Figure 3:
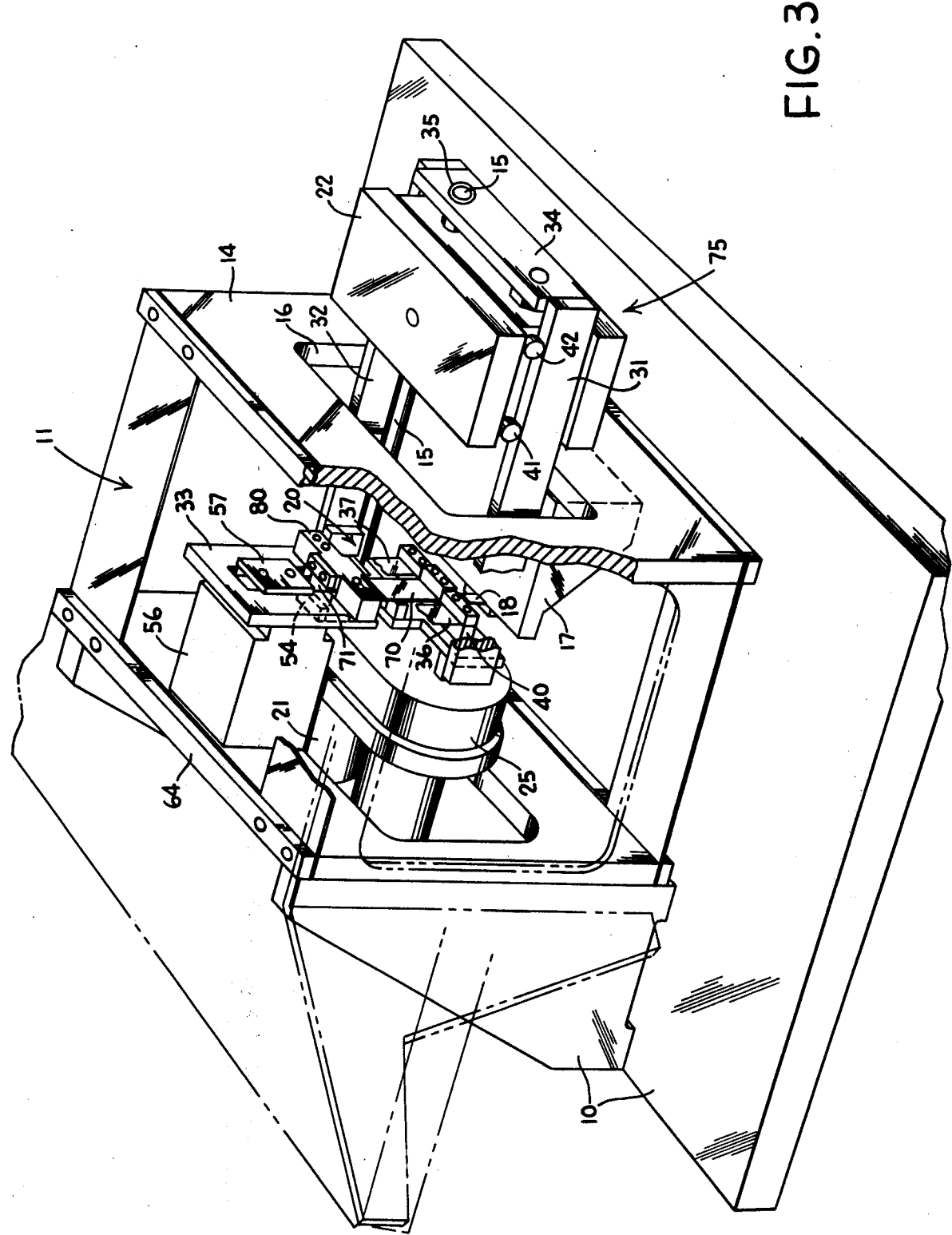
FIG. 3 is a perspective view of the analytical balance illustrated in FIG. 1.
Figure 4:
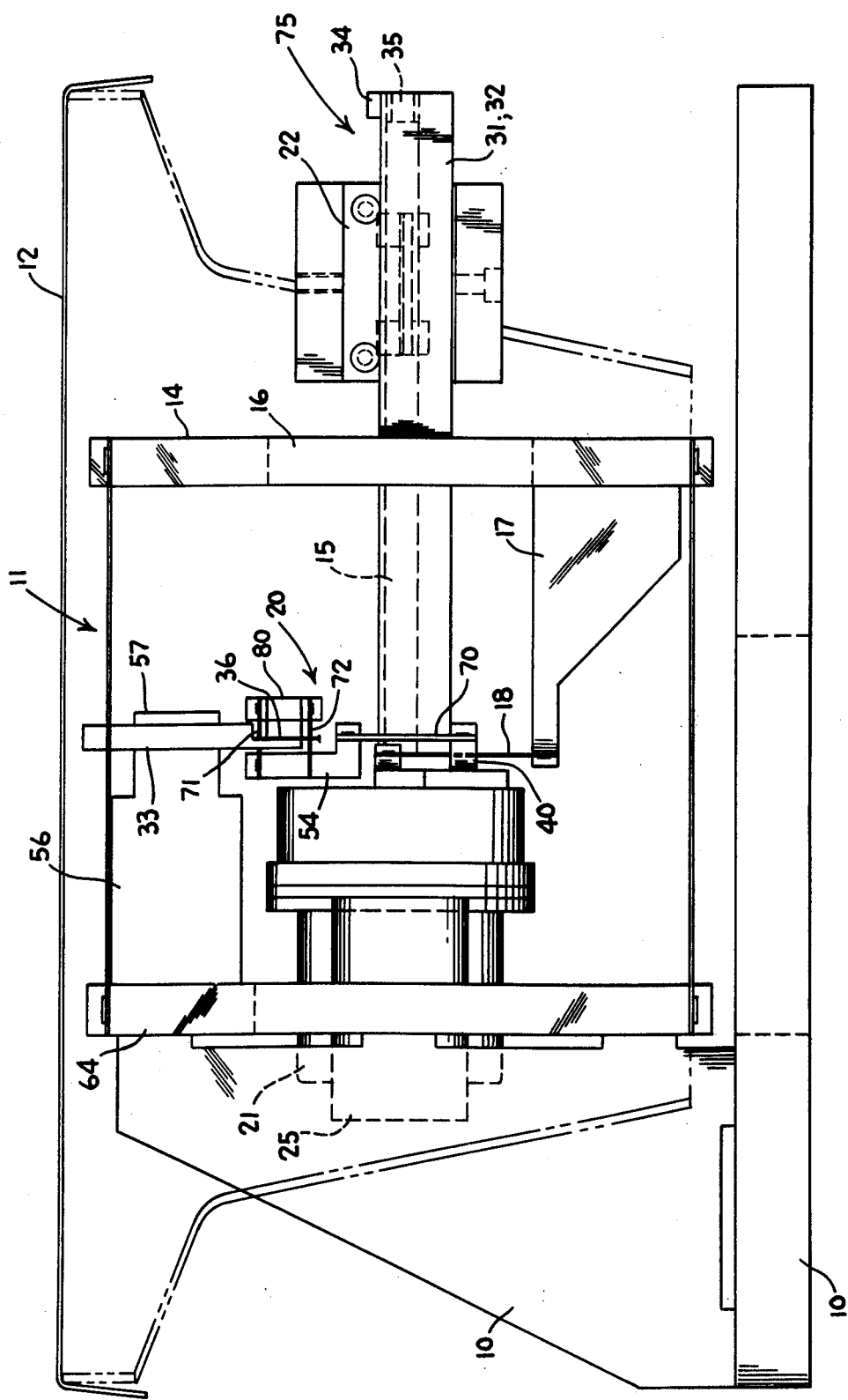
FIG. 4 is a side view of the analytical balance depicted in FIG. 3.

Referring to FIGS. 1, 3 and 4, schematic and constructional views of the inventive analytical balance are shown. The scale consists of a base and frame member 10, to which a flexural load support structure 11 is attached. The flexural support 11 can be of a twin leaf spring construction, or it may be a flexural pivot assembly, etc. A pan 12 is attached to the movable wall 14 of the flexural support 11 (FIG. 1) and will deflect (arrow 13) when a load 30 to be weighed is placed thereupon.

A pivotable shaft 15 extends horizontally through a portal 16 in flexural wall 14. A flange member 17 attached to, and extending from, the wall 14 is attached to the pivotable shaft 15 via a thin metal band 18. Thus, as the pan 12 deflects (arrow 13), the pivotable shaft 15 will be caused to pivot in a counterclockwise direction as shown by arrow 19. A null indicating transducer shown generally by arrow 20, and illustrated in greater detail in FIG. 5, senses the imbalance from the horizontal position that is experienced by the shaft 15. This balance sensing transducer 20 generates a signal which is sent to a motor 21. The motor 21 is attached to the shaft 15, and causes the shaft 15 to rotate in response to the unbalanced signal sent by transducer 20.

Shaft 15 has at least a portion thereof, that is threaded. In other words, shaft 15 can be thought of as a lead screw. When the lead screw (shaft 15) is rotated, a displaceable weight 22, that is threaded upon shaft 15, is caused to be advanced upon the shaft. The shaft 15 is rotated, and the weight 22 is moved, in such a manner as to bring shaft 15 into a horizontally balanced condition. In other words, the weight 22 is advanced along shaft 15 in direction 23 in order to cause a clockwise pivoting 24 of shaft 15. The weight 22 is advanced until transducer 20 senses a balanced condition, at which time, the motor 21 receives a signal from transducer 20 to stop rotating shaft 15.

The distance from the initial starting position to which the weight has moved, is indicative of the weight of the load that has been placed on pan 12. This distance can be measured from the amount of turns given to shaft 15 by the motor 11. For this purpose, the shaft 15 and motor 21 are operatively connected to a shaft encoder 25. This encoder 25 measures the number of revolutions of the shaft. This measurement is then fed to a counter, and is converted to a weight reading. The encoder used for this purpose may be of the type manufactured by Disc Instruments, Inc., Costa Mesa, California; Model EC80 Rotaswitch.

FIG. 2 shows in block diagram how the analytical balance system operates. When an unknown weight is placed on the pan 12, the pan weight 30 causes a pivoting of shaft 15 resulting in transducer 20 sensing an unbalance. The transducer 20 will actuate the motor 21, which will rotate lead screw (shaft) 15. Shaft 15 will rotate to advance the known balance weight 22, which will pivot the shaft 15 in an opposite sense, to eliminate the imbalance being sensed by transducer 20.

When a balanced condition is finally achieved, the encoder 25 will measure the total rotation of the lead screw 15, and will feed this information to a counter (conversion unit) 26 to convert this measurement into a direct weight reading.

The calculation necessary for this conversion is well known, and involves a summation of the moments about shaft 15, i.e., the known weight 22 multiplied by the distance it has traveled along shaft 15, equals the unknown weight 30 multiplied by the given distance it acts about the flexure pivot point of shaft 15. Solution of this moment equation will provide the weight of unknown weight 30.

Figure 6:
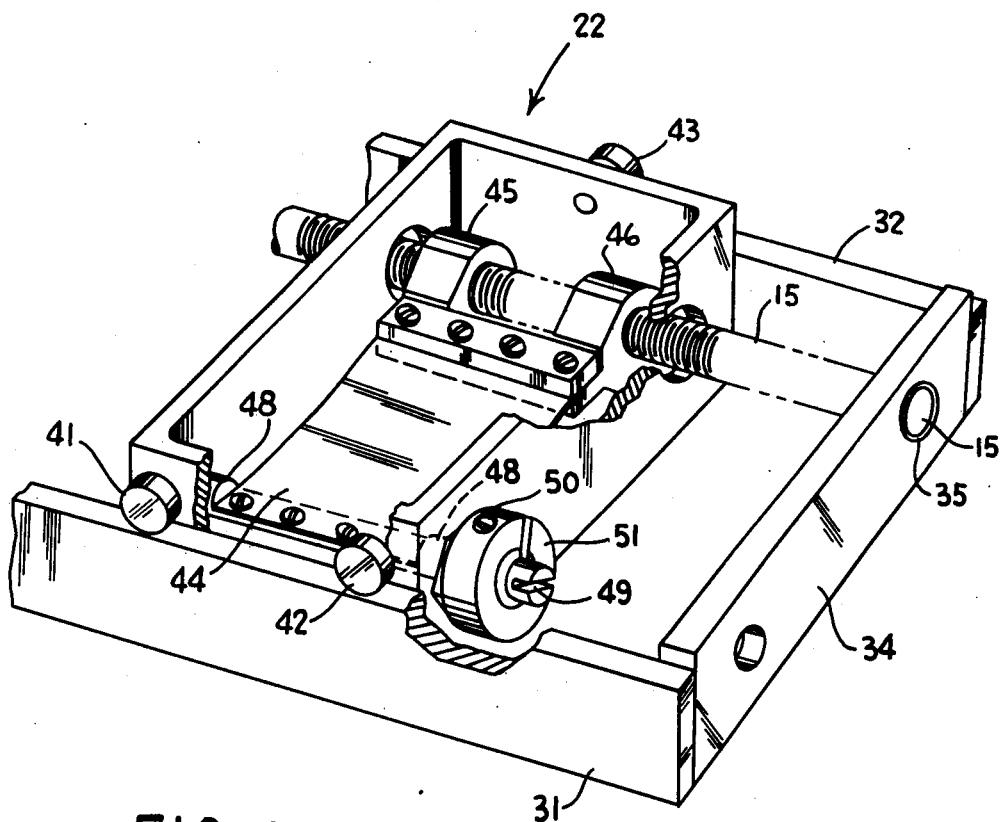
FIG. 6 is a perspective cutaway view of a balance weight and lead screw construction for eliminating backlash, as shown in the analytical balance of FIG. 3.

Referring to FIGS. 3, 4, and 6; the movable weight 22 and shaft 15 are shown in greater detail. The shaft 15 is actually part of a pivotable assembly 75 comprising side arms 31 and 32, which form an elongated box-like frame. The assembly of frame 75 comprises a cross-member 34 connected across arms 31 and 32, respectively. Shaft 15 is rotatably journalled within this frame, as can be seen from bearing 35, which is shown in cross-member 34 depicted in FIGS. 3 and 4. The shaft 15 and the frame pivot is a unit assembly, and are supported in pivotable movement by bands 36 and 37 of transducer 20, as will be explained in more detail hereinafter. The frame is secured to block 40 which in turn sandwiches bands 36 and 37 between blocks 38 and 39 (see FIG. 5).

In order that a fine adjustment be possible in the analytical balance, it is necessary to eliminate friction and backlash between the lead screw (shaft 15) and weight 22. To this end, the weight 22 has been designed to be primarily supported by rolling friction. Weight 22 is designed in box-like shape as seen in FIGS. 3 and 6. The weight itself carries three wheels 41, 42 and 43, which support weight 22 in rolling upon the arms 31 and 32 as shown. Since the arms 31 and 32 support the weight 22, very little friction is obtained at the lead screw connection between the weight 22 and shaft 15. Thus, the shaft 15 can very accurately and precisely move weight 22.

However, because a given amount of friction is still desirable to prevent backlash, a scheme was devised to load the lead screw with a given or predetermined amount of force. A leaf spring 44 is secured to journal members 45 and 46, respectively, as shown in FIG. 6. Journal members 45 and 46 are threaded to lead screw 15. The leaf spring 44 is secured to weight 22 via a shaft 48 which is journalled within weight 22. The shaft 48 can be rotated by the head of a screw driver placed in slot 49, in order to put tension in leaf spring 44. This tension will load the lead screw with a desired or given force via journals 45 and 46. A lock nut 51 and set screw 50 will hold shaft 48 in place in order to maintain the given tension on leaf spring 44. Thus, it will be seen that while the force of the weight 22 has been removed from the lead screw connections in journals 45 and 46, a predetermined force is put back in order to eliminate backlash via leaf spring 44.

Referring now to FIG. 5, the transducer 20 will be explained in greater detail. As aforementioned, the pivotable frame 75 is secured to bands 36 and 37, respectively, and thus the weight of the pivotable frame 75 is carried by these bands. Bands 36 and 37 are each in turn secured and supported by hollowed-out frame 33, which is rigidly attached to the main frame 10 via clamp 57, block 56, and wall 64. Thus, it is seen, that bands 36 and 37 support the major portion of the weight of the pivotable assembly 75, which support is directly traceable back to the main frame 10.

Bands 36 and 37 are made very thin relative to center band 70 of the transducer 20. This allows the pivotable assembly 75 to pivot easily, because bands 36 and 37 provide very little in the way of flexural resistance to this assembly.

Center band 70, is designed to be relatively thick and somewhat resistive to bending of the pivotable frame 75, and is connected to L-shaped flange 54, which is bendably supported by twin leaf springs 71 and 72. Leaf spring 71 and 72 are anchored to cross-bar 80, which in turn is secured to hollowed-out frame 33. Band 70 is connected on its other end to the pivotable assembly 75 via block 40.

Thus it can be seen, that the center band 70, while resistive to bending gives way to both bending and tension.

Thinner bands 36 and 37 are stiff or unyielding in tension or axial loading while the thicker center band is relatively soft and yieldable in tension or axial loading.

Thus, the two outer bands 36 and 37, while shouldering most of the weight of pivotable assembly 75, are almost completely yieldable to the pivoting moments of the assembly 75.

The center band 70, on the other hand, is yieldable to bending moments induced by assembly 75, and almost completely yieldable in the tension or axial loading produced by the assembly 75.

On the back of band 70 are mounted four strain gage elements 90, 90a, 91 and 91a, respectively. These strain gage elements detect the pivoting of assembly 75 in either a clockwise or a counterclockwise direction, respectively.

The accuracy of the strain gages 90, 90a, 91 and 91a for detecting pivoting of assembly 75 is greatly enchanced by the structural arrangement of bands 36, 37, and 70. These gages will not be distorted by the stresses induced by the weight of assembly 75, because this loading is supported by bands 36 and 37. These gage elements 90, 90a, 91 and 91a will also be free from deflecting errors because of the bendable supporting bridge comprising leaf springs 71 and 72. The strain gages, which are electrically arranged in a Wheatstone bridge will, however, be sensitive to the moments of the assembly 75.

Because of the unique construction of transducer 20 and the weight 22, it will be evident that a very sensitive automatic analytical balance has been obtained consistant with the prior mentioned objects of the invention.

Having described the invention, what is desired to be protected by Letters Patent is presented by the appended claims.

What is claimed is:

1. An automatic analytical weighing scale for measuring the weight of a load, comprising:
   a base;
   a load support structure carried by the base and movable in response to a load to be weighed being placed thereupon;
   a rotatable lead screw operatively connected to said load support, and supporting a movable balance weight threaded thereon, said lead screw being pivotably supported upon said base and being pivotable in response to movement of either said load support structure or said balance weight, the movement of the load support structure pivoting the lead screw in an opposite sense than that induced by the movement of the balance weight;

a motor operatively connected to said lead screw for rotatively driving said lead screw to movably advance said balance weight upon said lead screw;

a balance detector supported upon a bendable connecting strip disposed between the base and said lead screw, said bendable connecting strip being caused to flex when said lead screw is caused to pivot, whereby said balance detector senses flexure in said bendable connecting strip, and therefore, can detect when said lead screw has achieved a balanced pivotable condition to cancel the pivoting induced by the load support structure upon said lead screw due to placement of a weight upon said load support structure; and measuring means operatively connected to said lead screw for measuring the rotating of the lead screw, the measurement of said rotation being indicative of the weight of said load.

2. The automatic analytical weighing scale of claim 1, wherein said balance detector comprises strain gage means mounted on said bendable connecting strip.

3. The automatic analytical weighing scale of claim 1, wherein said measuring means comprises an encoder disc and a detector for measuring lead screw rotation, said lead screw rotation being indicative of the weight of said load.

4. An automatic analytical weighing scale for measuring the weight of a load, comprising:

a base;

a load support structure carried by the base and movable in response to a load to be weighed being placed thereupon;

a pivotable shaft operatively connected to said load support, and supporting a movable balance weight movable thereon, said shaft being pivotably supported upon said base and being pivotable in response to movement of either said load support structure or said balance weight, the movement of the load support structure pivoting the shaft in an opposite sense than that induced by the movement of the balance weight;

drive means operatively connected to said balance weight for movably advancing said balance weight upon said shaft;

a balance detector supported upon a bendable connecting strip disposed between the base and said shaft, said bendable connecting strip being caused to flex when said shaft is caused to pivot, whereby said balance detector senses flexure in said bendable connecting strip and therefore can detect when said shaft has achieved a balanced pivotable condition, said balance weight being advanced a sufficient distance along said shaft to cancel the pivoting induced by the load support structure upon said shaft due to placement of a weight upon said load support structure; and measuring means operatively associated with said balance weight for measuring the movement of said balance weight, said balance weight movement being indicative of the weight of said load.

5. The automatic analytical weighing scale of claim 4, wherein said balance detector comprises strain gage means mounted on said bendable connecting strip.

* * * * *